UNITED STATES PATENT OFFICE.

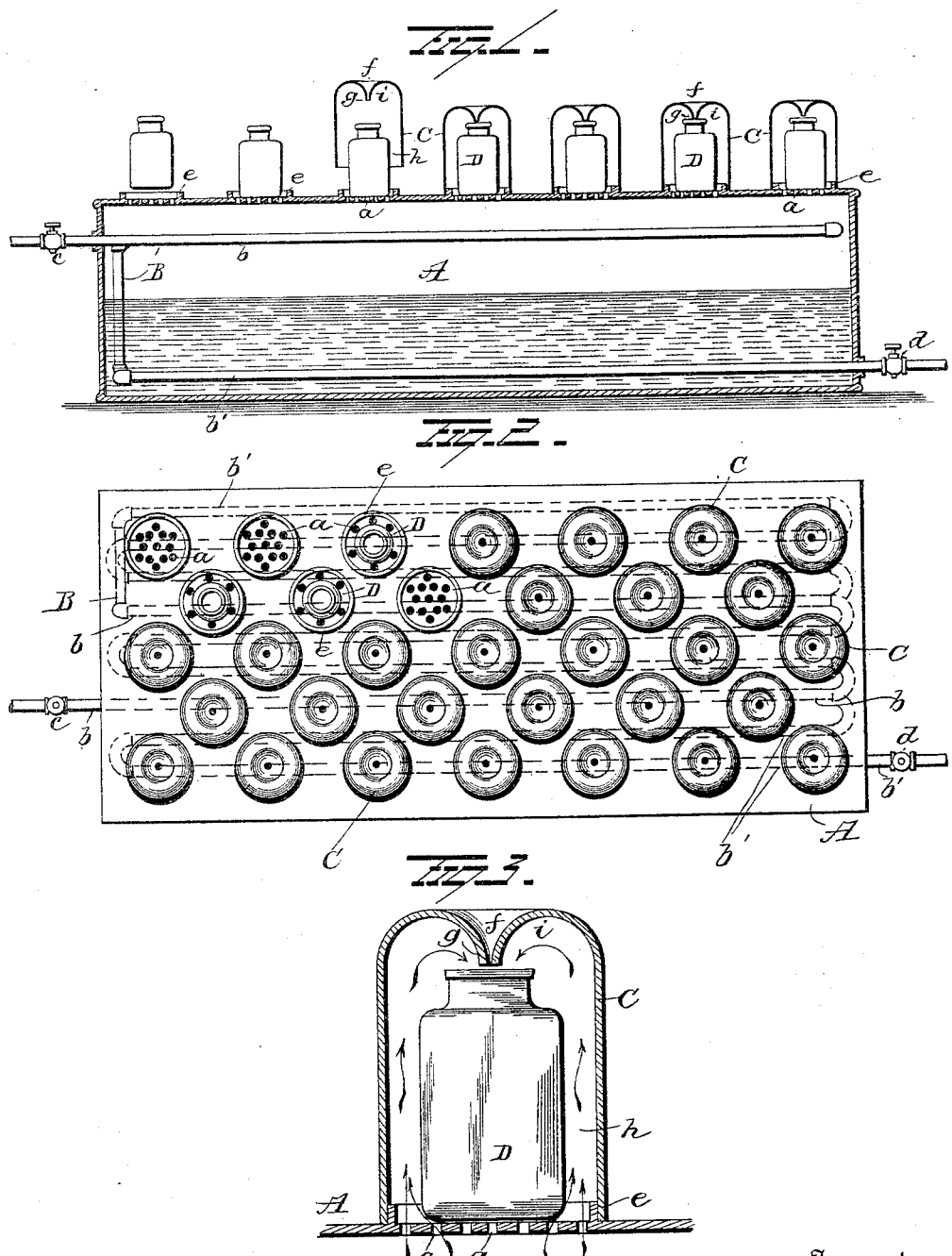

CHARLES F. MUDGE, OF ESKRIDGE, KANSAS.

STEAM CANNING DEVICE.

SPECIFICATION forming part of Letters Patent No. 454,523, dated June 23, 1891.

Application filed September 27, 1890. Serial No. 366,360. (No model.)

*To all whom it may concern:*

Be it known that I, CHARLES F. MUDGE, a citizen of Eskridge, in the county of Wabaunsee and State of Kansas, have invented certain new and useful Improvements in Steam Canning Devices; and I do hereby declare the following to be a full, clear, and exact description of the invention, such as will enable others skilled in the art to which it appertains to make and use the same.

My invention relates to an improvement in canning apparatus, and more particularly to steam canning devices, the present invention being designed as an improvement upon that for which Letters Patent of the United States were granted to me bearing date the 27th day of July, 1886, and numbered 346,122.

The object of my invention is to produce an apparatus by means of which fruit or other eatables stored in jars or other receptacles may be so prepared that they will retain all their flavor.

A further object is to produce an apparatus to be used in the process of canning, whereby the fruit or other eatables being canned will be prepared in such manner that their shape shall be maintained as well as their entire flavor.

A further object is to construct an apparatus for preparing canned materials in such manner that a number of cans may be prepared at the same time, and, if desired, so that fruits or vegetables of varying characters and flavors may be prepared at one time without danger of the flavor or odor of one commingling with or in any way affecting the others.

A further object is to construct an apparatus that will cheapen the price of fruits, &c., put up in glass jars.

With these objects in view the invention consists in certain novel features of construction and combinations and arrangements of parts, as hereinafter set forth, and pointed out in the claims.

In the accompanying drawings, Figure 1 is a perspective view, partly in section. Fig. 2 is a plan view. Fig. 3 is a detail view.

A represents a steam chest or chamber of sufficient size to receive a large number of fruit-jars thereon, a number of series of perforations $a$ being provided in the top of said chest, over which perforations the fruit-jars are placed, as presently explained.

Located in the steam-chest A is a coil of pipe B, two or three coils $b$ being located in the upper portion of the chest, and the remaining coils $b'$ (preferably at least seven) being located in the lower portion of the steam-chest. The upper end of the pipe B is extended beyond the tank and provided with a globe-valve $c$, while the other end of the coils extends beyond the opposite end of the steam chest or tank A in proximity to the bottom thereof and provided with a globe-valve $d$.

Surrounding each set of perforations $a$ on the top of the steam chest or tank A is a flange $e$, adapted to receive and hold in proper position a drum or cover C, which consists, preferably, of a hollow cylinder of thin metal, open at its bottom, and provided with a curved or conical top $f$, having a small vent $g$. The drum or cover C is somewhat deeper and has a diameter considerably greater than the jar over which it is placed, thus forming a steam-space $h$ between the jar and drum or cover and a steam-chamber $i$ over the jar.

The device being constructed and arranged as above set forth and a jar D being placed within each cover and over a series of perforations $a$, the steam chest or tank A is provided with sufficient water to cover the portion $b'$ of the coil B, the upper portion $b$ being at all times above the water-line. Steam is now admitted into the upper portion $b$ of the pipe and permitted to pass through the entire coil and out at the opposite end of the coil, which, as before stated, is in proximity to the bottom of the tank. The steam in passing through the coil of pipe B will heat the water in the steam chest or tank A, and the steam therefrom will rise and pass through the perforations in the top of the steam-chest into the drums or covers C. As the steam rises it passes the upper portion $b$ of the coils, (which is the hottest part of the coil,) and is thereby superheated, so that when the steam enters the drums C it is in a highly-heated or superheated condition. The steam thus highly heated is conducted into the jars D by the conical top of the drum or cover C and made to cook the contents of the jar, such cooking commencing at the top and cooking said fruit from the top downwardly, instead of from the bottom upwardly, as is usually the case. With the latter method the flavors will be driven off and the fruit or vegetable will be softened and made to lose its shape; but with my improved method of cooking from the top downwardly all the flavors will be retained in the fruit or vegetables and their shape will be maintained.

As the flavors and odors of the material being prepared will be retained in the materials, a very large number of jars may be employed at the same time, and different fruits and vegetables (such as peaches in some jars and onions in other jars) may be treated at the same time without the slightest liability of the flavor or odor of one commingling with or in the slightest degree affecting the other.

The device is very simple, easy to manipulate, and effective in the performance of its functions.

It is evident that slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. In a device for preparing canned materials, the combination, with a steam-chest having openings in its top, of a drum or cover adapted to envelop a jar, and devices in said steam-chest for producing superheated steam, substantially as set forth.

2. In a device for preparing canned materials, the combination, with a steam-chest having openings in its top, of a drum having a conical or depressed top and a vent, said drum or cover being adapted to envelop the jar, and devices in the steam-chest for producing superheated steam, substantially as set forth.

3. In a device for preparing canned materials, the combination, with a steam-chest, of a coil of pipe in said chest adapted to convey steam through the chest, said coil being adapted to be partly immersed in water, and the steam-chest having a series of openings in its top and a drum or cover over each set of openings, substantially as set forth.

4. In a device for canning, the combination, with a steam-chest having a number of series of perforations in the top thereof, of a flange surrounding each series of perforations, a drum or cover surrounding each flange and a jar, and devices in the steam-chest for producing superheated steam, substantially as set forth.

5. In a device for preparing canned materials, the combination, with a steam-chest adapted to be partly filled with water, of a coil of pipe in said steam-chest, a part of said coil being immersed in the water and a part being located above the water-line and adapted to be superheated by the steam arising from the water in the tank or steam-chest, said steam-chest being provided with a number of sets of perforations, over which jars are adapted to be placed, and a drum or cover adapted to envelop each jar and conduct the superheated steam from the steam-chest into the jars of material being treated, substantially as set forth.

In testimony whereof I have signed this specification in the presence of two subscribing witnesses.

CHARLES F. MUDGE.

Witnesses:
JOHN E. SEEDLER,
THOMAS A. HULME.